United States Patent
Chun et al.

(10) Patent No.: US 7,821,992 B2
(45) Date of Patent: Oct. 26, 2010

(54) HIGH SPEED UPLINK PACKET ACCESS SCHEME

(75) Inventors: Sung-Duck Chun, Anyang (KR); Young-Dae Lee, Hanam (KR)

(73) Assignee: LG Electronics Inc., Seoul (KR)

( * ) Notice: Subject to any disclaimer, the term of this patent is extended or adjusted under 35 U.S.C. 154(b) by 754 days.

(21) Appl. No.: 11/326,951

(22) Filed: Jan. 6, 2006

(65) Prior Publication Data

US 2006/0187844 A1 Aug. 24, 2006

Related U.S. Application Data

(60) Provisional application No. 60/650,903, filed on Feb. 7, 2005, provisional application No. 60/642,212, filed on Jan. 6, 2005.

(51) Int. Cl.
*H03M 13/33* (2006.01)
(52) U.S. Cl. .................. 370/329; 455/460; 455/464; 455/509
(58) Field of Classification Search .......... 370/329, 370/335, 350, 370, 473, 342, 394, 506, 328, 370/331; 455/67.11; 714/748, 749
See application file for complete search history.

(56) References Cited

U.S. PATENT DOCUMENTS

| 7,414,989 | B2 * | 8/2008 | Kuchibhotla et al. ........ 370/329 |
|---|---|---|---|
| 2002/0049068 | A1 | 4/2002 | Koo et al. |
| 2003/0007458 | A1 | 1/2003 | Procopio |
| 2003/0007459 | A1 | 1/2003 | Yi et al. |
| 2003/0016698 | A1 | 1/2003 | Chang et al. |
| 2003/0156580 | A1 | 8/2003 | Abraham et al. |
| 2004/0028160 | A1 | 2/2004 | Bienek et al. |
| 2004/0037224 | A1 | 2/2004 | Choi et al. |
| 2004/0160925 | A1 * | 8/2004 | Heo et al. ................ 370/335 |
| 2004/0208160 | A1 * | 10/2004 | Petrovic et al. ............ 370/350 |
| 2004/0208169 | A1 | 10/2004 | Reznik |
| 2005/0243762 | A1 * | 11/2005 | Terry et al. ............... 370/328 |
| 2005/0251722 | A1 * | 11/2005 | Terry et al. ............... 714/749 |
| 2006/0034240 | A1 * | 2/2006 | Kwak et al. .............. 370/342 |
| 2006/0034285 | A1 * | 2/2006 | Pirskanen et al. .......... 370/394 |

(Continued)

FOREIGN PATENT DOCUMENTS

EP 1304900 A2 4/2003

(Continued)

OTHER PUBLICATIONS

Ericsson: "HARQ Retransmission and failure indication for improved outer loop power control" 3GPP TSG RAN WG3 Meeting 45, Nov. 15, 2004.

(Continued)

*Primary Examiner*—Dang T Ton
*Assistant Examiner*—Lionel Preval
(74) *Attorney, Agent, or Firm*—Lee, Hong, Degerman, Kang & Waimey

(57) ABSTRACT

Improvements to the High Speed Uplink Packet Access (HSUPA) scheme have been made. Among the three main aspects, providing Optimized Rate Request Reporting, providing Signaling for Lower Delay Delivery, and providing a MAC-e PDU Format for Control Information, the Signaling for Lower Delay Delivery may be considered as the main improvement, while the other two aspects can be supplementary improvements.

20 Claims, 5 Drawing Sheets

U.S. PATENT DOCUMENTS

| | | |
|---|---|---|
| 2006/0062223 A1* | 3/2006 | Manuel et al. ............... 370/394 |
| 2006/0072504 A1* | 4/2006 | Hu .............................. 370/331 |
| 2006/0084389 A1* | 4/2006 | Beale et al. ............... 455/67.11 |
| 2006/0120404 A1* | 6/2006 | Sebire et al. ................. 370/469 |
| 2006/0146889 A1* | 7/2006 | Malkamaki et al. ......... 370/506 |
| 2007/0008990 A1* | 1/2007 | Torsner ....................... 370/473 |
| 2007/0079207 A1* | 4/2007 | Seidel et al. ................. 714/748 |
| 2007/0183451 A1* | 8/2007 | Lohr et al. ................... 370/473 |
| 2007/0189282 A1* | 8/2007 | Lohr et al. ................... 370/370 |

FOREIGN PATENT DOCUMENTS

| | | |
|---|---|---|
| EP | 1494366 A1 | 1/2005 |
| GB | 2400277 A | 10/2004 |
| JP | 62-24722 | 8/1994 |
| JP | 2002-027020 | 1/2002 |
| JP | 2003-324496 | 11/2003 |
| JP | 2004-502362 | 1/2004 |
| JP | 2004-120237 | 4/2004 |
| JP | 2004-159300 | 6/2004 |
| JP | 2004-537181 | 12/2004 |
| JP | 2005-065298 | 3/2005 |
| JP | 2005-525739 | 8/2005 |
| RU | 2128406 | 3/1999 |
| RU | 2235437 | 8/2004 |
| TW | 200427273 A | 12/2004 |
| TW | 200501771 A | 1/2005 |
| WO | WO 01/72081 | 9/2001 |
| WO | 03/069838 | 8/2003 |
| WO | 2004/051872 | 6/2004 |
| WO | 2004/073273 | 8/2004 |
| WO | WO 2006/085174 | 8/2006 |

OTHER PUBLICATIONS

Enderle N, et al. "Radio link control-acknowledged mode protocol performance modeling in units" Mobile and wireless communications network. Sep. 9, 2002.

Change Request "HARQ Failure Indication due to MAC-e Reset in UE" 3GPP TSG-RAN3 Meeting #51, Feb. 2006.

Enderle N., et al., "Radio link control-acknowledged mode protocol performance modeling in UMTS," Workshop on 4th Int'l Mobile and Wireless Communications Network, Dec. 10, 2002, pp. 332-336.

Ericsson, "HARQ Retransmission and Failure Indication for Improved Outer Loop Power Control," 3GPP TSG RAN WG3 Meeting #45, Nov. 15, 2004, R3-041503.

* cited by examiner

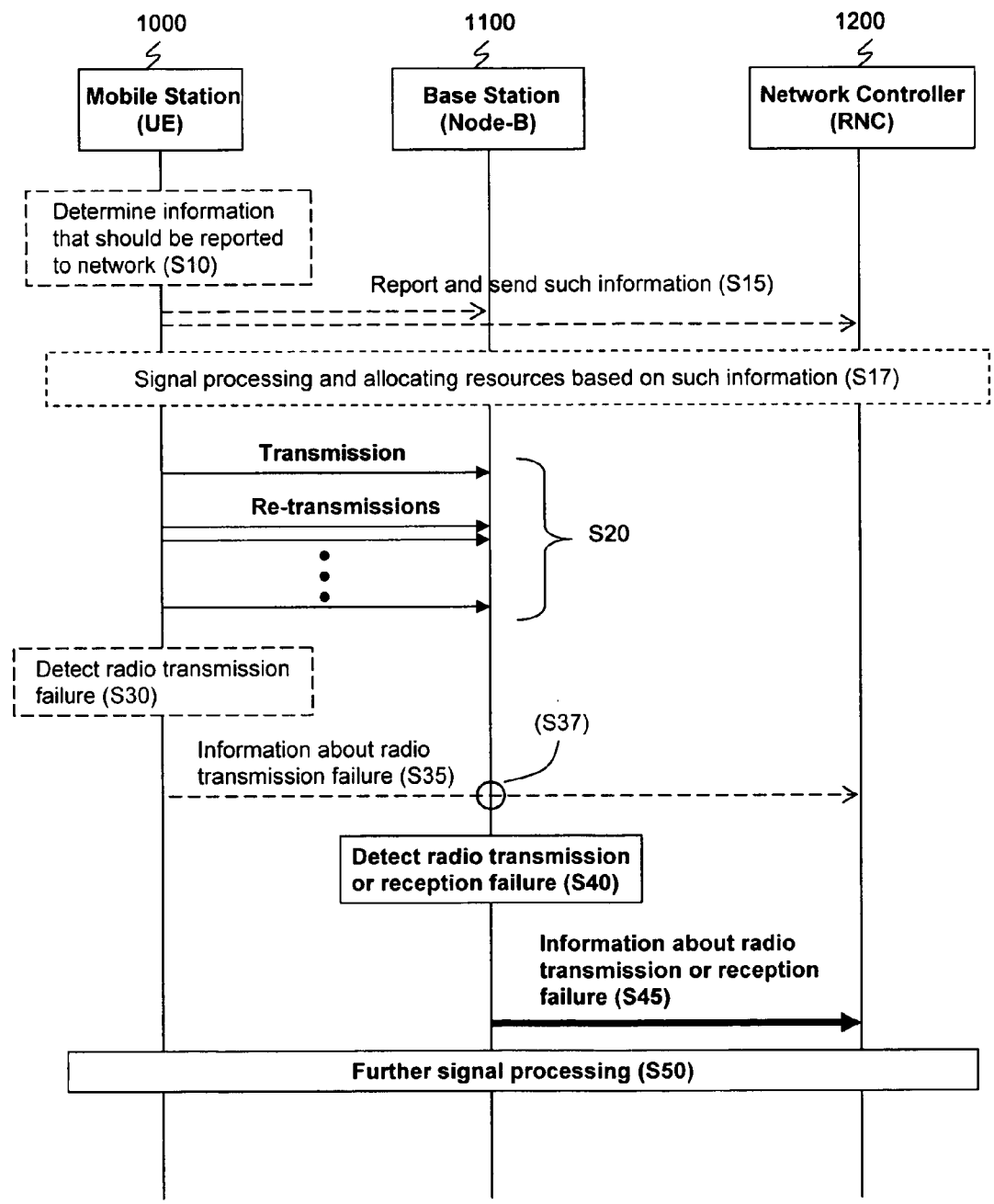

HIGH SPEED UPLINK PACKET ACCESS SCHEME

CROSS REFERENCE TO RELATED APPLICATION

Pursuant to 35 U.S.C. §119(e), this application claims the benefit of earlier filing date and right of priority to U.S. Provisional Application Nos. 60/642,212, filed Jan. 6, 2005 and 60/650,903, filed on Feb. 7, 2005, the contents of which are hereby incorporated by reference herein in their entirety.

FIELD OF THE INVENTION

The present invention relates to wireless (radio) communications, and more particularly, relates to providing improvements to the High Speed Uplink Packet Access (HSUPA) scheme.

BACKGROUND ART

A Universal Mobile Telecommunications System (UMTS) is a third generation mobile communications system that evolved from the European Global System for Mobile communications (GSM) that aims to provide an improved mobile communications service based upon a GSM core network and W-CDMA (Wideband Code Division Multiple Access) wireless connection technology.

FIG. 1 illustrates an exemplary basic structure of a UMTS network (100). The UMTS is roughly divided into a terminal 100 (e.g., mobile station, User Equipment, etc.), a UMTS Terrestrial Radio Access Network (UTRAN) 120, and a core network (CN) 130. The UTRAN 120 consists of one or more radio network sub-systems (RNS: 121, 122). Each RNS consists of one radio network controllers (RNC: 123, 124) and one or more base stations (e.g., Node-Bs: 125, 126) that are managed by the RNC. One or more cells exist for each Node-B.

The RNC (123, 124) handles the assigning and managing of radio resources, and operates as an access point with respect to the core network 130. The Node-Bs (125, 126), thus operate as access points of the UTRAN 120 for the terminal 100. Also, the RNC (123, 124) allocates and manages radio resources and operates as an access point with the core network 130.

Between various network structure elements, there exists an interface that allows data to be exchanged for communication therebetween.

FIG. 2 illustrates a radio interface protocol architecture (structure) between the terminal 100 and the UTRAN 120 that is based upon a 3GPP wireless access network technology. Here, the radio access interface protocol has horizontal layers including a physical layer, a data link layer, and a network layer, and has vertical planes including a user plane for transmitting data information and a control plane for transmitting control signals. The user plane is a region to which traffic information of a user (such as voice data, IP (Internet Protocol) packets and the like) are transmitted. The control plane is a region to which control information (such as the interface of the network, maintenance and management of calls, and the like) is transmitted.

Also in FIG. 2, the protocol layers can be divided into a first layer (L1), a second layer (L2), and a third layer (L3) based upon the three lower layers of an open system interconnection (OSI) scheme that is a well-known in the art of wireless (mobile) communication systems.

The first layer (L1) is a physical layer (PHY) that provides information transfer service to upper layers by using various radio transmission techniques. The first layer (L1) is connected to a medium access control (MAC) layer that is located thereabove via a transport channel through which data travels between the MAC layer and the physical layer. Also, between the different physical layers (namely, between the respective physical layers of the transmitting side and the receiving side), data is transferred via a physical channel.

The medium access control (MAC) layer handles the mapping between the logical channels and the transport channels, and provides a re-allocation service of the MAC parameter for allocation and re-allocation of radio (wireless) resources.

The MAC layer of the second layer (L2) is connected to an upper layer called a radio link control (RLC) layer through a logical channel, and various logical channels are provided according to the type of transmitted information. Namely, the MAC layer provides services to an upper layer (the RLC layer) via a logical channel. The RLC layer of the second layer (L2) can support reliable data transmissions, and can perform a segmentation and concatenation function on a plurality of RLC service data units (RLC SDUs) delivered from an upper layer.

A packet data convergence protocol (PDCP) layer is located at an upper layer from the RLC layer, allowing data to be transmitted effectively via a radio interface with a relatively small bandwidth through a network protocol.

The radio resource control (RRC) layer located at the lowest portion of the third layer (L3) is only defined in the control plane, and controls the transport channels and the physical channels in relation to the configuration, the re-configuration, and the releasing of the radio bearers (RBs).

The radio bearer service refers to a service that the second layer (L2) provides for data transmission between the terminal (UE) 110 and the UTRAN 120 in order to guarantee a predetermined quality of service by the UE and the UTRAN. And in general, the radio bearer (RB) establishment refers to regulating the protocol layers and the channel characteristics of the channels required for providing a specific service, as well as respectively setting substantial parameters and operation methods.

Among the RBs, the particular RB used between the UE and the UTRAN for exchanging RRC messages or NAS messages is called a SRB (Signaling Radio Bearer). When an SRB is established between a particular UE and the UTRAN, a RRC connection exists between the UE and the UTRAN. A UE having a RRC connection is said to be in RRC connected mode, and a UE without a RRC connection is said to be in idle mode. When a UE is in RRC connected mode, the RNC determines the cell in which the UE is located (i.e., the RNC determines the UE location in units of cells), and manages that UE.

The MAC layer of the second layer provides a service to an upper layer of a radio link control (RLC) layer through a logical channel. The MAC layer is sub-divided into several types of sub-layers such as a MAC-d sub-layer and a MAC-e sub-layer according to the type of transport channel that is managed.

A related art structure of a dedicated channel (DCH) and an enhanced dedicated channel (E-DCH) is illustrated in FIG. 3. As shown, the DCH 14 and the E-DCH 16 are dedicated transport channels used by one mobile terminal. In particular, the E-DCH 16 is used to transmit data to the UTRAN 120 at a high speed compared to the DCH 14. In order to transmit data at a high speed, various techniques may be employed for the E-DCH 16 such as a HARQ (Hybrid ARQ), an AMC (Adaptive Modulation and Coding), and a Node B controlled scheduling, and the like.

For the E-DCH 16, the Node B 125 or Node B 126 transmits downlink control information to a mobile UE 110 to control the E-DCH transmission of the mobile UE 110. The downlink control information may include response information (ACK/NACK) for the HARQ, channel quality information (CQI) for the AMC, E-DCH transmission rate information, E-DCH transmission start time and transmission time period information, and a transport block size information for the Node B controlled scheduling, or the like.

Meanwhile, the UE 110 transmits uplink control information to the Node B 12. The uplink control information may include E-DCH transmission rate request information, UE buffer status information, and UE power status information for the Node B controlled scheduling, or the like. The uplink control information and the downlink control information for the E-DCH 16 are transmitted through a physical control channel such as an E-DPCCH (Enhanced Dedicated Physical Control Channel).

For the E-DCH 16, a MAC-d flow 18 is defined between the MAC-d sublayer 24 and the MAC-e sublayer 26. In this case, a dedicated logical channel is mapped to a MAC-d flow, the MAC-d flow is mapped to the E-DCH 16, a transport channel, and the E-DCH 16 is mapped to an E-DPDCH (Enhanced Dedicated Physical Data Channel) 20, a physical channel. Also, the dedicated logical channel can be directly mapped to the DCH 14, also a transport channel, and the DCH 14 is mapped to the DPDCH (Dedicated Physical Data Channel) 22.

The MAC-d sub-layer 24, as shown in FIG. 3, manages the DCH 14, the dedicated transport channel of a specific terminal. The MAC-e sub-layer 26 manages the E-DCH 16, the transport channel used for transmitting high-speed uplink data.

A MAC-d sub-layer of a transmitting side generates a MAC-d PDU (Protocol Data Unit) from a MAC-d SDU (Service Data Unit) received from an upper layer, namely, the RLC layer. Alternatively, a MAC-d sub-layer of a receiving side restores the MAC-d SDU from the MAC-d PDU received from a lower layer and delivers it to an upper layer. The MAC-d sub-layer may transmit the MAC-d PDU to the MAC-e sub-layer through a MAC-d flow, or transmit the MAC-d PDU to a physical layer through the DCH. The MAC-d sub-layer of the receiving side then restores the MAC-d SDU by using a MAC-d header included in the MAC-d PDU and then transfers the MAC-d SDU to the upper layer.

The MAC-e sub-layer of the transmitting side generates a MAC-e PDU from the MAC-d PDU, generated from the MAC-e SDU, received from the MAC-d sub-layer. Alternatively, the MAC-e sub-layer of the receiving side restores the MAC-e SDU from the MAC-e PDU received from the physical layer, and transfers it to an upper layer. In this case, the MAC-e sub-layer transmits the MAC-e PDU to the physical layer through the E-DCH. The MAC-e sub-layer of the receiving side then restores the MAC-e SDU by using a MAC-e header included in the MAC-e PDU and then transfers it to the upper layer.

A protocol model for a related art E-DCH is illustrated in FIG. 4. As shown, the MAC-e sub-layer supporting the E-DCH exists at a lower position of the MAC-d sub-layer of the UTRAN 120 and the terminal (UE) 110. The MAC-e sub-layer 30 of the UTRAN 120 is positioned in the Node B. The MAC-e sub-layer 32 exists in each terminal 28. Comparatively, the MAC-d sub-layer 34 of the UTRAN 120 is positioned in an SRNC for managing a corresponding terminal 28. Each terminal 28 includes a MAC-d sub-layer 36.

The QoS of ongoing flows mapped on E-DCH for a UE is maintained by the serving Node B and by the UE. In addition to these mechanisms, guaranteed bit rate services for MAC-d flows/logical channels (FFS) are also supported through non-scheduled transmission. A flow using non-scheduled transmission is defined by the SRNC and provided in the UE and in the Node B. The UE can transmit data belonging to such flow without first receiving any scheduling grant.

To the UE, the following QoS-related information may be provided from the SRNC to enable QoS-based E-TFC selection, multiplexing of logical channels in MAC-e PDUs, and HARQ operation:

Logical channel priority for each logical channel (as in Rel-5);

Mapping between logical channel(s) and MAC-d flow(s) (as in Rel-5);

Allowed MAC-d flow combinations in one MAC-e PDU;

HARQ profile per MAC-d flow. One HARQ profile consists of a power offset attribute and a maximum number of transmissions attribute. The power offset attribute is used in E-TFC selection to regulate the BLER operating point for the transmission. The maximum number of transmissions attribute is used in the HARQ operation to regulate maximal latency and residual BLER of MAC-d flows.

To the Node B, the following QoS-related parameters are provided by the SRNC to enable scheduling and resource reservation:

Power offset or E-TFC (FFS) that corresponds to the guaranteed bit rate (only for MAC-d flows/logical channels that carry guaranteed bit rate services). For scheduled transmission, it is used to allocate grants to UEs. For non-scheduled transmission, it is used for the Node B to reserve sufficient amount of resources. The need for additional mechanisms to optimize the Node-B hardware is FFS (e.g. the UE may tell the Node-B ahead that an non-scheduled transmission is coming);

UE takes into account following principles:

The E-TFC selection is based on logical channel priorities like in the Release '99, i.e. the UE shall maximise the transmission of higher priority data;

The UE shall respect the allowed combinations of MAC-d flows in the same MAC-e PDU;

The power offset of E-DPDCH(s) relative to DPCCH associated to a MAC-e PDU including MAC-d PDUs coming from one or several MAC-d flows is set as follows;

The UE selects the power offset of the HARQ profile associated to the MAC-d flows with the highest priority logical channel in the MAC-e PDU;

Upon considering the various issues described above in view of FIGS. 1 through 4, the present inventors recognized that improvements to the High Speed Uplink Packet Access (HSUPA) scheme would be highly desirable.

SUMMARY

One aspect of the present invention involves the recognition by the present inventors of the drawbacks in the related art. Namely, in the related art, the network (i.e., base station and network controller, Node-B and RNC, UTRAN, etc.) is not provided with enough information for optimal performance, particularly in High Speed Uplink Packet Access (HSUPA). Based upon such recognition, improvements to the HSUPA scheme have been made according to the present invention. More specifically, improved signaling for lower delay delivery is provided, and optimized rate request reporting as well as a MAC-e PDU format for control information can solve the related art problems.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings:

FIG. 6 shows exemplary procedures related to the improvements to the High Speed Uplink Packet Access (HSUPA) scheme according to the present invention.

DETAILED DESCRIPTION

The present invention is described as being implemented in a UMTS mobile communications system. However, the present invention may also be adapted and implemented in communications systems operating under other types of communication specifications, because the concepts and teachings of the present invention could be applied to various communication schemes that operate in a similar manner based upon common techniques. Non-limiting exemplary embodiments of the present invention are explained below with reference to the attached Figures.

Improvements to the High Speed Uplink Packet Access (HSUPA) scheme can be considered in the following aspect: providing Signaling for Lower Delay Delivery of FIGS. 5 and 6 will be referred to in explaining the features of the present invention hereafter.

Signalling For Lower Delay Delivery (FIG. 6, steps S20~S50)

To achieve maximum throughput, unnecessary delay should be minimized in the overall HSUPA (High Speed Uplink Packet Access) operation. In HSUPA, delay elements may consist of scheduling at the UE, HARQ retransmission, Iub interface delay, and re-ordering at the SRNC.

Hereafter, the re-ordering delay will be considered and a signaling procedure to prevent unnecessary waiting in the reordering queue will be described.

The worst case HARQ delay may be quite large. On the one hand, ambiguity in reordering the received MAC-e PDUs should be avoided, and at the same time, all possible delays should be taken into consideration to prevent unnecessary PDU discarding.

However, if it is evident that there is no need to wait for previous PDUs related to a certain PDU, the re-ordering queue operation should immediately process and deliver that PDU to the upper layer. This is because unnecessary delay can eventually cause PDU discarding to occur in the upper layers or cause an undesirably longer time in performing acknowledgements (ACK or NACK) for AM PDUs, which would thus impact overall throughput.

Unfortunately, because the related art performs little signaling to the SRNC, the above effects caused by the delay are unavoidable.

Figure 1:
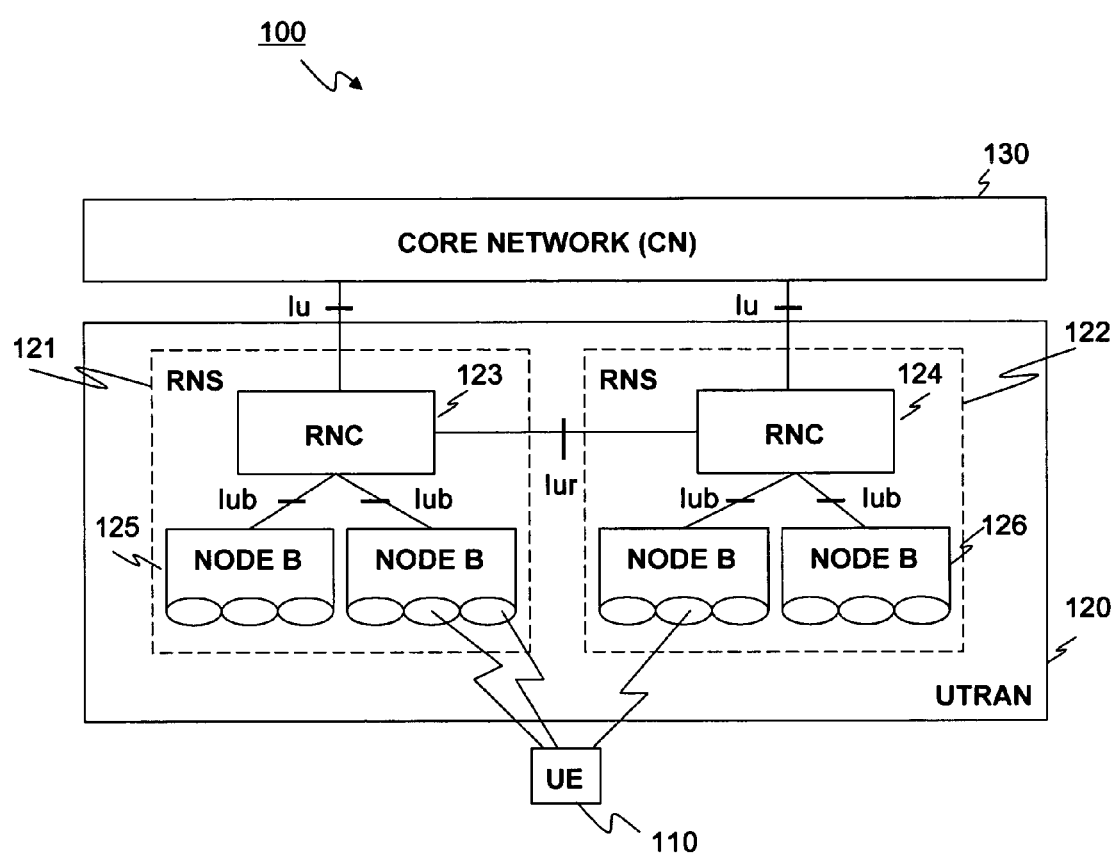
FIG. 1 depicts a general UMTS network architecture.
Figure 2:
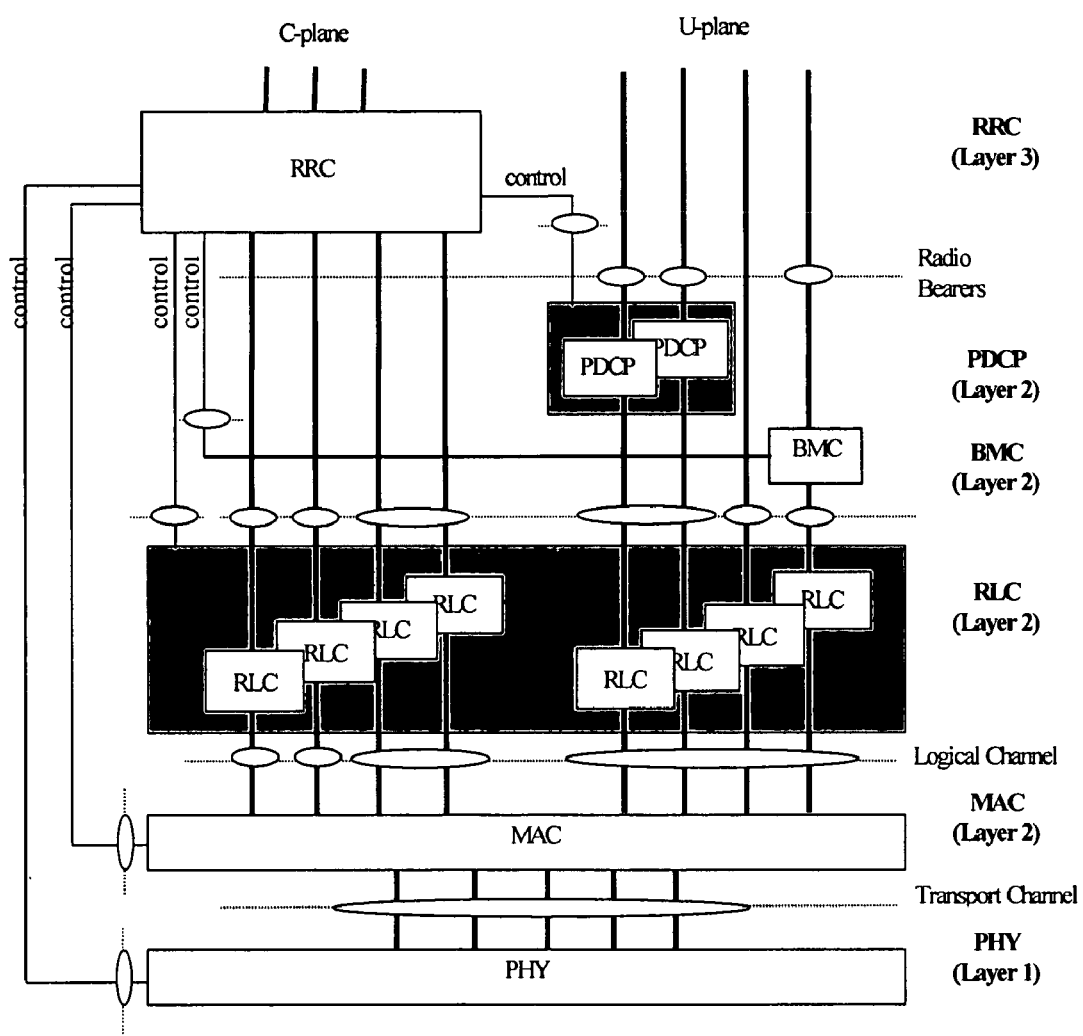
FIG. 2 depicts a radio (wireless) interface protocol structure between the UE and UTRAN based upon the 3GPP radio access network.
Figure 3:
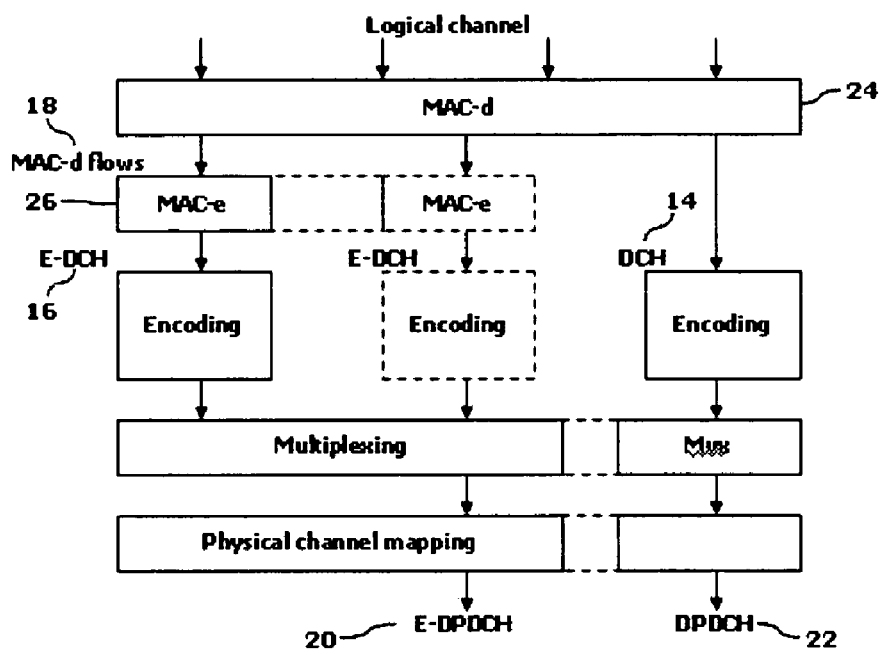
FIG. 3 illustrates the structure of a dedicated channel (DCH) and an enhanced dedicated channel (E-DCH).
Figure 4:
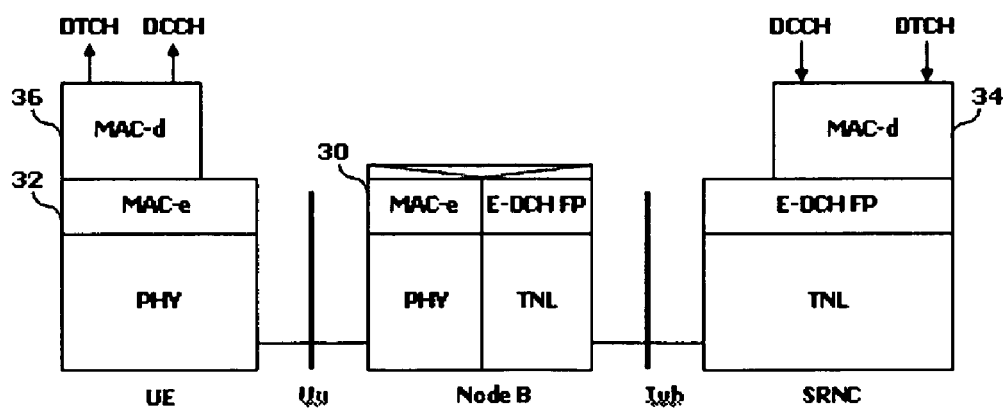
FIG. 4 illustrates a protocol model for a related art E-DCH.
Figure 5:
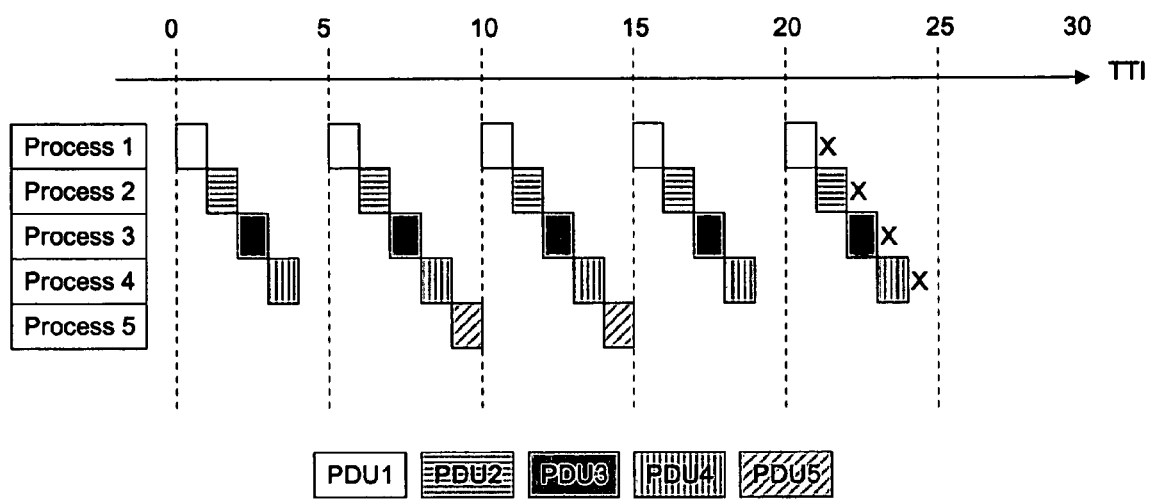
FIG. 5 illustrates an example of PDU delivery delays for HARQ processes.

FIG. 5 shows an example of PDU delivery delays. It is assumed that there are 5 (HARQ) processes for the UE, merely for the sake of explanation. The actual number of processes would depend upon various conditions in the communications environment.

The HARQ processes from 1 to 4 start a new transmission at TTI from 0 to 3, respectively, while HARQ process 5 starts a new transmission at TTI 9. It is assumed that MAC-e PDU 5 is correctly received at TTI 14 and MAC-e PDUs from 1 to 4 reach maximum number of retransmission at TTI from 20 to 23 without successful reception at the Node-B.

For simplicity, it is further assumed that MAC-e PDUs from 1 to 5 contain MAC-es PDUs from the same logical channel. With this assumption, it is natural to assume that all the MAC-es PDUs included in the MAC-e PDUs from 1 to 4 precede all the MAC-es PDUs included in the MAC-e PDU 5.

In this example, at TTI 24, smart Node-B implementation may know that the MAC-es PDUs in MAC-e PDU 5 does not have to wait for the MAC-es PDUs in MAC-e PDUs 1-4 (i.e., the previous MAC-es PDUs). This is because all the preceding MAC-e PDUs have failures in their transmission. Even though the MAC-e PDUs 1-4 included MAC-es PDUs from other logical channels, it's hard to imagine that MAC-es PDUs preceding MAC-es PDUs in MAC-e PDU 5 will be received at a TTI later than 24, unless we assume that the TSN setting entity works backward.

There is no signaling from Node-B to SRNC except, the number of retransmissions for the received PDU and the initial TTI of transmission of the PDU for re-ordering operation. In other words, the Node-B does not tell the SRNC anything about, which process has successfully decoded the MAC-e PDU, which process has failed with maximum number of re-transmissions, or at what TTI the last unsuccessful re-transmission has occurred, etc.

Thus, in the above example, the MAC-es PDUs in MAC-e PDU 5 should wait in the reordering queue of the SRNC for a longer time than actually needed, because the SRNC re-ordering queue has no information about whether there is the possibility that previous MAC-es PDUs can be received in the future or not.

Actually, for the SRNC, its operation is not strictly described in the current 3GPP specification. As such, whether to use a timer mechanism, a window mechanism or another mechanism is implementation dependent. But the problem described here is that without information being provided to the SRNC, the smart or efficient operation that will minimize delays and enhance throughput will be limited.

Accordingly, the present inventors recognized these problems and provided two possible solutions. One is to provide signaling from the UE to the SRNC and the other is signaling from the Node-B to the SRNC.

a) From UE to SRNC

In this method, the UE gives the SRNC information that indicates what TSN the SRNC can wait for or what TSN the SRNC should give up waiting for. Specifically, when MAC-e PDU transmission fails even after the allowed number of retransmission has been performed, the UE informs the SRNC about the TSN of MAC-es PDUs that were included in the failed MAC-e PDU. Or, after detecting a failure of transmission, the UE includes the lowest TSN that the SRNC can wait for.

Such TSN information can be included in the control information part of the MAC-e PDU and transferred from Node-b to SRNC.

But the demerit of this mechanism is that it takes another TTI to inform the SRNC, even though a MAC-e PDU that includes only control information needs to be used.

b) From Node-B to SRNC

In this mechanism, the Node-B HARQ gives more information related to the HARQ operation to the SRNC. For example, in above example shown in FIG. 7, if the Node-B informs the SRNC about the reception status per process, the SRNC can optimize the re-ordering operation.

More specifically, when the MAC-e PDU is correctly received, the Node-B informs the SRNC about the process ID that was used to receive the MAC-e PDU or MAC-es PDU. And when the Node-B detects that reception of a MAC-e PDU failed, stopped or started, it also notifies the SRNC about the process ID that was related.

By using all these information about the process ID and its status information from the Node-B, the SRNC is able to know whether to wait for the previous MAC-es PDUs for a certain received MAC-es PDU in the reordering queue. This eventually leads to reduced waiting at the SRNC.

Also, the above method of informing process information every time to the SRNC may cause a larger load over the Iub interface. But this can be solved, if the Node-B looks into successfully received MAC-e PDU and uses the HARQ status, the Node-B can directly inform the SRNC as to what the SRNC can wait for and what it need not wait for. Not only is this a more simple solution, but also this will cause less overheads over the Iub interface.

However, one issue here is related to how to provide reliable decoding of the E-DPCCH.

After unsuccessful decoding of the E-DCH payload and under the conditions listed below, the serving Node-B shall send a HARQ Failure Indication to the SRNC. The non-serving Node-B(s) shall not send a HARQ Failure Indication.

The serving Node-B shall send a HARQ Failure Indication to the SRNC under the following conditions:

A HARQ process has not yet been successfully decoded and a New Data Indicator (NDI) is received for the same HARQ process and the number of HARQ retransmissions that had already occurred was strictly higher than the lowest of the MAC-d flows maximum HARQ retransmission values.

A HARQ process has not yet been successfully decoded and the maximum retransmissions for the MAC-d flow with the highest maximum HARQ retransmission valid for the UE connection have occurred, or should have occurred in case the HARQ related outband signaling on the E-DPCCH could not be decoded.

The HARQ Failure Indication shall be sent using the transport bearer carrying the highest priority MAC-d flow. If there are more than one MAC-d flows with the highest priority, then the Node-B shall use only one of the transport bearers associated with these MAC-d flows.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Namely, the present invention provides a method of signaling between a base station and a network controller, comprising: detecting at least one radio transmission failure based upon a number of radio transmission retransmissions that occurred; and providing information to the network controller regarding the detected radio transmission failure to allow further signal processing thereafter.

Here, the provided information may comprise a radio transmission failure indication. The detecting and providing may be performed by the base station. The base station may be a Node-B. The network controller may be a Radio Network Controller. The radio transmission may be related to Hybrid Automatic Repeat request (HARQ). The step of detecting may further comprise: comparing the number of radio transmission retransmissions with a threshold. The threshold may be a maximum number of retransmissions allowed. If the maximum number is greater than the threshold, the informing step may be subsequently performed. The further signal processing may be to reduce data transmission delay.

The provided information informs the network controller about which HARQ process has successfully decoded a MAC-e PDU, which HARQ process has failed with maximum number of re-transmissions, and/or at what Transmission Time Interval a last unsuccessful re-transmission has occurred. The providing information step may further comprise: sending a HARQ Failure Indication to the network controller if either, a HARQ process has not yet been successfully decoded and a New Data Indicator is received for the same HARQ process and the number of HARQ retransmissions that had already occurred was strictly higher than the lowest of the MAC-d flows maximum HARQ retransmission values, or a HARQ process has not yet been successfully decoded and the maximum retransmissions for the MAC-d flow with the highest maximum HARQ retransmission valid for the UE connection have occurred, or should have occurred in case the HARQ related outband signaling on the E-DPCCH could not be decoded.

The HARQ Failure Indication may be sent by using a transport bearer carrying a highest priority MAC-d flow. If there are more than one MAC-d flows with the highest priority, then only one of the transport bearers associated with these MAC-d flows is selected and used.

Also, the present invention provides a method of signaling between a base station and a network controller, comprising: receiving a radio transmission failure indication based upon at least one radio transmission failure that was detected based upon a number of radio transmission retransmissions that occurred; and performing further signal processing according to the received radio transmission failure indication.

Furthermore, the present invention provides method of improved High Speed Uplink Packet Access signaling in a communication system with User Equipment and a network controller, the method comprising: providing information to the network controller regarding radio transmission failures based upon a detected number of radio transmission retransmissions that occurred; and preventing unnecessary Protocol Data Unit discarding based upon the provided information to thus increase data throughput by minimizing delays due to performing scheduling at the User Equipment, performing HARQ retransmissions, performing Iub interface signaling, and/or performing re-ordering at the network controller.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of processing data blocks transmitted in sequence from a user equipment (UE) to a network controller by way of an at least one intermediary base station in a mobile communication network, the method comprising:
   transmitting a sequence of data blocks from the UE to the base station for decoding;
   monitoring a number of times a data block among said sequence of data blocks has been retransmitted from the UE to the base station;
   detecting a radio transmission failure when the number of times that the data block has been retransmitted from the UE to the base station exceeds a predetermine threshold; and
   providing failure information from the base station to the network controller, wherein the failure information is associated with the data block that has been retransmitted in excess of the predetermined threshold and not successfully decoded by the base station, such that the network controller proceeds to process the sequence of data blocks successfully decoded by the base station, in response to receiving the failure information from the base station,
   wherein the failure information identifies the data block that has been retransmitted to the base station for decoding in excess of the predetermined threshold, and not successfully decoded by the base station, so that the network controller in response to receiving the failure information continues to process successfully decoded data blocks without waiting to receive the retransmitted data block, wherein the radio transmission is related to Hybrid Automatic Repeat request (HARQ), and
   wherein providing the failure information comprises:
   sending a HARQ failure indication to the network controller if either, a HARQ process has not yet been successfully decoded and an indicator for indicating transmission of new data is received for the same HARQ process and the number of HARQ retransmissions that had already occurred was higher than the lowest of MAC-d flows maximum HARQ retransmission values, or
   sending a HARQ failure indication to the network controller if a HARQ process has not yet been successfully decoded and the maximum retransmissions for a MAC-d flow with the highest maximum HARQ retransmission valid for a UE connection have occurred, or should have occurred in case the HARQ related outband signaling on an E-DPCCH could not be decoded.

2. The method of claim 1, wherein the provided failure information comprises a radio transmission failure indication for the data block.

3. The method of claim 1, wherein the detecting and providing are performed by the base station.

4. The method of claim 3, wherein the base station is a Node-B.

5. The method of claim 1, wherein the network controller is a Radio Network Controller.

6. The method of claim 1, wherein the predetermined threshold represents a maximum number of retransmissions for a data block from the UE to the base station.

7. The method of claim 6, wherein the data block that is not successfully decoded by the base station is discarded by the base station when the number of times the data block has been retransmitted from the UE to the base station exceeds the predetermined threshold.

8. The method of claim 7, wherein processing delay in the network controller is reduced due to the network controller recognizing in advance not to expect to receive the discarded data block based on receiving the failure information.

9. The method of claim 1, wherein the failure information provides the network controller with information about a HARQ process that has successfully decoded a MAC-e PDU, and a HARQ process that has failed with maximum number of re-transmissions, and/or the transmission time interval during which a last unsuccessful re-transmission has occurred.

10. The method of claim 1, wherein the HARQ Failure Indication is sent by using a transport bearer carrying a highest priority MAC-d flow.

11. The method of claim 10, wherein if there are more than one MAC-d flows with the highest priority, then only one of the transport bearers associated with these MAC-d flows is selected and used.

12. The method of claim 1, wherein the detecting and providing are performed by a user equipment that is in communication with the base station.

13. The method of claim 12, further comprising: reporting a buffer status of the user equipment to the base station and/or the network controller, by informing available power information and the amount of data buffered in the user equipment that received no scheduling grant, or by informing the difference in the amount of buffer between the times when the reports are generated by the user equipment that received a scheduling grant.

14. The method of claim 12, further comprising: transferring control information from a user equipment to the base station and/or the network controller when there is no granted rate for the user equipment or when there are some granted rates for the mobile station.

15. The method of claim 14, further comprising: deciding to use the same or different MAC-e PDU formats for the transferring by verifying if multiplexing of control information and MAC-es PDUs is allowed; and forming MAC-e control information based upon the deciding.

16. A method of signaling between a base station and a network controller in a mobile communication network, the method comprising:
   receiving in a base station first and second data blocks from a user equipment (UE), wherein the first and second data blocks are respectively associated with first and second HARQ processes;
   attempting to decode the first and second data blocks in the base station; requesting retransmission of the first data block from the UE to the base station, in response to determining that the first data block has not been successfully decoded by the base station and determining a value of a first retransmission attribute associated with the first data block based on a number of times the first data block has been retransmitted from the UE to the base station;
   transmitting the second data block to a network controller from the base station, in response to successfully decoding the second data block in the base station;
   determining that decoding of the first data block has failed when the value of the first retransmission attribute exceeds a first threshold;
   forwarding a failure signal to the network controller from the base station indicating that the decoding of the first data block has failed, so that the network controller continues to process the second data block successfully decoded by the base station without waiting to receive the first data block from the base station and
   wherein the radio transmission is related to Hybrid Automatic Repeat request (HARQ), and
   wherein providing the failure information comprises:

sending a HARQ failure indication to the network controller if either, a HARQ process has not yet been successfully decoded and an indicator for indicating transmission of new data is received for the same HARQ process and the number of HARQ retransmissions that had already occurred was higher than the lowest of MAC-d flows maximum HARQ retransmission values, or sending a HARQ failure indication to the network controller if a HARQ process has not yet been successfully decoded and the maximum retransmissions for a MAC-d flow with the highest maximum HARQ retransmission valid for a UE connection have occurred, or should have occurred in case the HARQ related outband signaling on an E-DPCCH could not be decoded.

17. A method of signaling between a base station and a network controller in a mobile communication network, the method comprising:

determining whether a value of a retransmission attribute associated with a data block associated with an HARQ process and received from a user equipment (UE) has exceeded a predetermined threshold, wherein the retransmission attribute represents a number of times the data block is retransmitted to a base station, due to the data block not being successfully decoded by a base station; and forwarding a failure signal to a network controller indicating that the decoding of the data block has failed, so that the network controller continues to process other data blocks successfully decoded by the base station without waiting to receive the data block from the base station and wherein the radio transmission is related to Hybrid Automatic Repeat request (HARQ), and wherein providing the failure information comprises:

sending a HARQ failure indication to the network controller if either, a HARQ process has not yet been successfully decoded and an indicator for indicating transmission of new data is received for the same HARQ process and the number of HARQ retransmissions that had already occurred was higher than the lowest of MAC-d flows maximum HARQ retransmission values, or sending a HARQ failure indication to the network controller if a HARQ process has not yet been successfully decoded and the maximum retransmissions for a MAC-d flow with the highest maximum HARQ retransmission valid for a UE connection have occurred, or should have occurred in case the HARQ related outband signaling on an E-DPCCH could not be decoded, wherein the failure information identifies the data block that has been retransmitted to the base station for decoding in excess of the predetermined threshold, and not successfully decoded by the base station, so that the network controller in response to receiving the failure information continues to process successfully decoded data blocks without waiting to receive the retransmitted data block.

18. A method of signaling between a base station and a network controller in a mobile communication network, the method comprising:

monitoring a number of times a data block has been retransmitted from a user equipment (UE) to a base station for decoding;

detecting a radio transmission failure when the number of times the data block has been retransmitted from the UE to a base station exceeds a predetermined threshold;

providing failure information to the network controller, wherein the failure information is associated with the data block that has been retransmitted in excess of the predetermined threshold, wherein the radio transmission is related to Hybrid Automatic Repeat request (HARQ), and wherein providing the failure information comprises sending a HARQ Failure Indication to the network controller if a HARQ process has not yet been successfully decoded and an indicator for indicating transmission of new data is received for the same HARQ process and the number of HARQ retransmissions that had already occurred was higher than the lowest of the MAC-d flows maximum HARQ retransmission values, wherein the failure information identifies the data block that has been retransmitted to the base station for decoding in excess of the predetermined threshold, and not successfully decoded by the base station, so that the network controller in response to receiving the failure information continues to process successfully decoded data blocks without waiting to receive the retransmitted data block.

19. A method of signaling between a base station and a network controller in a mobile communication network, the method comprising:

monitoring a number of times a data block has been retransmitted from a user equipment (UE) to a base station for decoding;

detecting a radio transmission failure when the number of times the data block has been retransmitted from the UE to a base station exceeds a predetermined threshold;

wherein the radio transmission is related to Hybrid Automatic Repeat request (HARQ), and wherein providing the failure information comprises sending a HARQ failure indication to the network controller if a HARQ process has not yet been successfully decoded and the maximum retransmissions for a MAC-d flow with the highest maximum HARQ retransmission valid for a UE connection have occurred, or should have occurred in case the HARQ related outband signaling on an E-DPCCH could not be decoded, wherein the failure information identifies the data block that has been retransmitted to the base station for decoding in excess of the predetermined threshold, and not successfully decoded by the base station, so that the network controller in response to receiving the failure information continues to process successfully decoded data blocks without waiting to receive the retransmitted data block.

20. A method of signaling between a base station and a network controller in a mobile communication network, the method comprising:

monitoring a number of times a data block has been retransmitted from a user equipment (UE) to a base station for decoding;

detecting a radio transmission failure when the number of times the data block has been retransmitted from the UE to a base station exceeds a predetermined threshold; and providing failure information to the network controller, wherein the failure information is associated with the data block that has been retransmitted in excess of the predetermined threshold, wherein the radio transmission is related to Hybrid Automatic Repeat request (HARQ), and wherein providing the failure information comprises sending a HARQ Failure Indication to the network controller if a HARQ process has not yet been successfully decoded and the number of HARQ retransmissions that had already occurred was higher than the lowest of the MAC-d flows maximum HARQ retransmission values.

wherein the failure information identifies the data block that has been retransmitted to the base station for decoding in excess of the predetermined threshold, and not successfully decoded by the base station, so that the network controller in response to receiving the failure information continues to process successfully decoded data blocks without waiting to receive the retransmitted data block.

* * * * *